United States Patent
Suga

(10) Patent No.: US 7,685,429 B2
(45) Date of Patent: Mar. 23, 2010

(54) SIGNATURE-GENERATION METHOD, SIGNATURE-VERIFICATION METHOD, PUBLIC-KEY DISTRIBUTION METHOD, AND INFORMATION-PROCESSING APPARATUS

(75) Inventor: Yuji Suga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1103 days.

(21) Appl. No.: 11/239,623

(22) Filed: Sep. 29, 2005

(65) Prior Publication Data

US 2006/0075246 A1    Apr. 6, 2006

(30) Foreign Application Priority Data

Oct. 5, 2004    (JP)    ............... 2004-293075

(51) Int. Cl.
*H04L 9/32* (2006.01)
(52) U.S. Cl. ............... 713/180; 380/45; 380/28; 380/29; 380/281; 713/176; 713/177; 713/181; 713/170; 726/10; 726/30
(58) Field of Classification Search ............ 380/37, 380/217, 3, 4, 47, 30, 285, 282, 278, 279, 380/268, 259, 29, 45; 713/170, 180, 181; 726/30
See application file for complete search history.

(56) References Cited

U.S. PATENT DOCUMENTS 5,016,274 A * 5/1991 Micali et al. .................. 705/66
6,640,301 B1 * 10/2003 Ng ............................. 713/156
2002/0038420 A1 * 3/2002 Collins et al. ............... 713/156
2002/0108042 A1 * 8/2002 Oka et al. .................... 713/175
2005/0005077 A1 * 1/2005 Heinrich ..................... 711/154
2005/0114666 A1 * 5/2005 Sudia ......................... 713/175

OTHER PUBLICATIONS

"Digital Signature Standard"—U.S. Department of Commerce/National Institute of Standards and Technology (Jan. 27, 2000).*
Data Networks and Open System Communications—ITU-T Recommendation X.509 (ITU 1995).*
Hanaoka, et al., "Unconditionally Secure Digital Signature Schemes Admitting Transferability", ASIACRYPT 2000, LNCS 1976,pp. 130-142, 2000.
International Telecommunication Union, "Data Networks and Open System Communications", ITU 1995.
U.S. Department of Commerce, "Digital Signature Standard", Federal Information Processing Standards Publication, 2000.

* cited by examiner

*Primary Examiner*—Taghi T Arani
*Assistant Examiner*—Mohammad L Rahman
(74) *Attorney, Agent, or Firm*—Canon U.S.A., Inc. I.P. Division

(57) ABSTRACT

To generate and verify signature data using a known signature algorithm whose safety is ensured from the viewpoint of calculation quantity and ensuring the authenticity thereof over a long time period. A message to be signed is transmitted, a padding-data item is added to the message, and a signature-data item of the message with the padding-data item added thereto is generated by using a hash function and a public-key cryptosystem. The addition step and the generation step are performed a predetermined number of times by using the signature-data item, as the padding-data item, and the signature-data items generated the predetermined number of times and the padding-data items added the predetermined number of times are externally transmitted with the message.

4 Claims, 10 Drawing Sheets

SIGNATURE-GENERATION METHOD, SIGNATURE-VERIFICATION METHOD, PUBLIC-KEY DISTRIBUTION METHOD, AND INFORMATION-PROCESSING APPARATUS

BACKGROUND OF THE INVENTION

1. Field of the Invention

The present invention relates to a technology adapted to generate signature data that can be stored over a long term for transmitted digital data and verify the signature data.

2. Description of the Related Art

In recent years, digital data on a document and/or an image is distributed via a wide-area network such as the Internet. However, since the digital data can be easily modified, the digital data may be altered by a third party. Therefore, a digital-signature technology has been proposed as a method for verifying padding data used for preventing alteration. According to the digital-signature technology, a user can detect whether or not data transmitted thereto is altered. The digital-signature technology is adapted to prevent not only data alteration, but also spoofing, repudiation, and so forth on the Internet.

[Digital Signature]

Digital-signature data is generated by using a hash function and a public-key cryptosystem. More specifically, first, a private key Ks and a public key Kp are prepared. Then, on the transmission side, transmission data M is subjected to hash processing so that fixed-length data H(M) is calculated, and the fixed-length data H(M) is converted by using the private key Ks so that digital-signature data S is generated. After that, the digital-signature data S and the transmission data M are transmitted to the reception side.

On the reception side, the digital-signature data S is converted (decoded) by using the public key Kp. Then, it is determined whether or not the converted data agrees with data obtained by subjecting the transmission data M to the hash processing. If the verification result shows that the converted data does not agree with the data obtained by subjecting the transmission data M to the hash processing, it is determined that the transmission data M is altered.

The digital signature is generated by using a known public-key-cryptosystem method such as the RSA method, the DSA method, and so forth. According to the above-described methods, the security of a digital signature is ensured based on the premise that it is difficult for an entity other than the owner of the private key to substitute the signature and/or decipher the private key from the viewpoint of calculation quantity.

FIG. 1 shows the signing-process performed for generating the above-described digital-signature data and the verifying-process performed for verifying transmission data by using the digital-signature data.

[Hash Function]

Next, the hash function used for increasing the speed of generating the digital-signature will be described. The hash function is used for processing the transmission data M of an arbitrary length so that output data of a predetermined length is generated. Here, output data H(M) is referred to as hash data of plain-text data M. Particularly, where a one-way hash function is used and the plain data M is provided, it is difficult to calculate plain-text data M', where the expression H(M')=H(M) holds, from the viewpoint of calculation quantity. Here, there are standard algorithms including MD2, MD5, SHA-1, and so forth that can be used, as the one-way hash function. The above-described algorithms are in public view.

[Public-Key Cryptosystem]

Next, the public-key cryptosystem will be described. The public-key cryptosystem uses two different keys, where data encrypted by using one of the keys is decrypted only by using the other key. One of the two keys is referred to as a public key and released, so as to be in public view. The other key is referred to as a private key and is controlled only by the owner thereof.

A digital signature using the above-described public-key-cryptosystem method may be, for example, a DSA signature, an RSA signature, a Schnorr signature, and so forth. Hereinafter, the DSA signature will be described, as an example digital signature.

[DSA Signature]

Next, a method disclosed in "Federal Information Processing Standards (FIPS) 186-2, Digital Signature Standard (DSS), January 2000", will be described. Each of parameters p and q denotes a prime number, where the prime number q is divisible by p−1. A specifier g is determined to be an element of order q (generator), where the element is arbitrarily selected from among a group $Z\_p^*$ (a multiplicative group obtained by subtracting 0 from a cyclic group $Z\_p$ of the order p. Data x arbitrarily selected from the multiplicative group $Z\_p^*$ is determined to be a private key and the public key y corresponding to the private key is shown by the expression $y:=g^x$ mod p. The specifier H( ) denotes the hash function.

[DSA-Signature Generation]

Procedural steps performed for generating the signature corresponding to a document M is shown below:

1) $\alpha$ is arbitrarily selected from $Z\_q$, where the expression $T:=(g^\alpha \bmod p) \bmod q$ holds.

2) The expression c:H(M) holds.

3) The expression $s:\alpha^{-i}(c+xT) \bmod q$ holds, where (S, T) is determined to be signature data.

[DSA-signature Verification]

Procedural steps performed for verifying the signature data (s, T) for the document M will be described. It is verified whether or not the expression $T=(g^{H(M)/s} y^{T/s} \bmod p) \bmod q$ holds.

As has been described, the digital-signature technology can prevent spoofing, data alteration, repudiation, and so forth on the Internet. Further, the safety of the digital signature is often ensured based on the premise that it is difficult for an entity other than the owner of the private key to counterfeit the signature and/or decipher the private key, from the viewpoint of the calculation quantity. The above-described DSA-signature technology is one of signature methods configured to ensure the safety of a digital signature based on the premise that a large quantity of calculations are required for counterfeiting the signature and/or deciphering the private key.

On the other hand, in the fields of administration, health care, and so forth, a digital signature is required by law to be stored over a long term such as five or ten years. However, the currently used digital-signature technologies have problems (1) and (2) that will be described later, so that a technology adapted to store a signature over a long term, namely, a system configured to ensure the authenticity of the signature over the long term is required. The above-described system is supposed to be used, particularly with an electronic-authentication system and a time-stamping system in combination.

(1) A digital signature cannot be stored over a long term in the unit of ten years due to advanced deciphering technologies and computers of increased performance.

(2) A public key and/or a private key with an expired public-key certificate may be used for checking the validity of a digital signature.

As a method adapted to solve the above-described problems (1) and (2), a signature method on the basis of information theoretic security has been disclosed in, for example, "G. Hanaoka, J. Shikata, Y. Zheng, and H. Imai, Unconditionally secure digital signature schemes admitting transferability, Advances in Cryptology—ASIACRYPT 2000, LNCS 1976, pp. 130 to 142, Springer—Verlag, 2000". According to the above-described technology, the security of a signature can be ensured without depending on the calculation quantity.

However, the above-described signature technology is still in a studying stage toward commercialization. Further, the concept of the above-described signature technology was not known up until the recent past and has room to be studied. Still further, the above-described signature technology has problems such that there is no compatibility between the above-described signature technology and the known signature technologies that have been used.

SUMMARY OF THE INVENTION

The present invention allows generating and verifying signature data that uses a known signature algorithm achieved based on computational security and that can ensure the authenticity thereof over a long term.

A signature-generation method according to an aspect of the present invention includes: a transmission step of transmitting a message to be signed; an addition step of adding a padding-data item to the message; a generation step of generating a signature-data item of the message to which the padding-data item is added by using at least one hash function and at least one public-key cryptosystem; performing the addition step and the generation step a predetermined number of times by using the signature-data item as the padding-data item; and an external transmission step of transmitting the signature-data items that are generated by performing the generation step the predetermined number of times and the padding-data items that are added by performing the addition step the predetermined number of times with the message.

A signature-verification method according to another aspect of the present invention includes: a transmission step of transmitting a message to be signed, a signature-data item, and a padding-data item; an addition step of adding the padding-data item to the message; a signature-verification-performing step of performing signature verification, so as to verify the message to which the padding-data item is added by using at least one hash function and the signature-data item; and an external transmission step of transmitting a result of the signature verification.

Further features of the present invention will become apparent from the following description of exemplary embodiments with reference to the attached drawings.

DESCRIPTION OF THE EMBODIMENTS

Hereinafter, embodiments of the present invention will be described in detail with reference to the attached drawings.

First Embodiment

Figure 2:
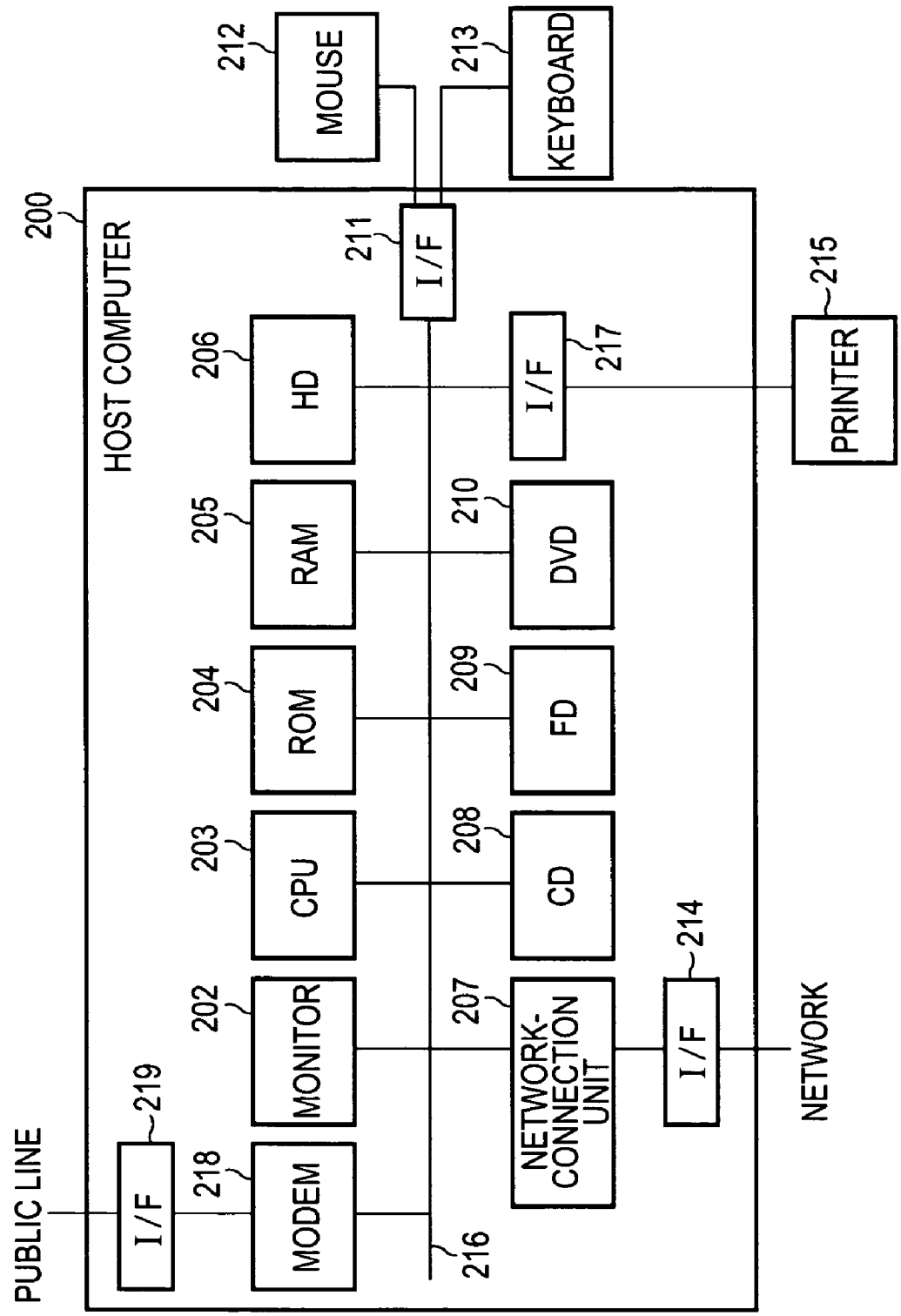
FIG. 2 shows the configuration of an exemplary information-processing apparatus according to a first embodiment of the present invention.

FIG. 2 shows the configuration of an example information-processing system according to a first embodiment of the present invention. It is to be noted that all of the functions shown in FIG. 2 do not need to be used for achieving the present invention.

As shown in FIG. 2, a host computer 200 includes a modem 218, a monitor 202, a central-processing unit (CPU) 203, a read-only memory (ROM) 204, a random-access memory (RAM) 205, a hard-disk (HD) drive 206, a network-connection unit 207, a compact-disk (CD) drive 208, a flexible-disk (FD) drive 209, a digital-video-disk or digital-versatile-disk (DVD) drive 210, an interface (I/F) 217 between the host computer 200 and a printer 215, and an I/F 211 between the host computer 200, and a mouse 212 and a keyboard 213 that are configured to function, as operation units. The above-described units are connected to one another via a bus 216 so that they can communicate with one another. Hereinafter, the above-described units of the host computer 200 will be described in sequence.

First, the mouse 212 and the keyboard 213 are provided, as the operation units used by a user, so as to transmit various instructions to the host computer 200. Information (operation information) transmitted from the user via the above-described operation units is transmitted to the host computer 200 via the interface 211.

Various information items (e.g., a text information item, an image-information item, and so forth) generated by the host computer 200 are printed and output by the printer 215.

The monitor 202 produces display images of various types of information items including various instruction-information items, the text-information item, the image-information item, and so forth that are generated for the user.

In the first embodiment, the CPU 203 functions, as a controller configured to control the operations performed by the host computer 200. Namely, by reading a processing program (software program) from the HD 206 or the like and executing the program, the CPU 203 controls the host computer 200.

In the first embodiment, particularly, the CPU 203 reads a processing program configured to perform a sign-generation function and a sign-verification function from the HD 206 or the like and executes the read processing program and information-conversion processing is performed. The details of the information-conversion processing will be described later.

The ROM 204 stores a program configured to boot the system, various types of processing programs and/or control data.

The RAM 205 is used, for example, as a work area configured to temporarily store the processing program and information to be processed that are used for various processing performed by the CPU 203.

The HD 206 is an example large-capacity storage device of the host computer 200. The HD 206 stores, for example, a processing program configured to convert various data items and/or information. The information is transferred to the RAM 205 or the like, where various processing is performed.

The CD drive 208 reads data stored in an external recording medium, such as a CD (e.g., a CD-recordable (CD-R)), and/or writes data onto the CD-R.

As is the case with the above-described CD drive 208, the FD drive 209 reads data stored in the external recording medium, such as the FD. Further, the FD drive 209 writes various data items onto the FD.

As is the case with the above-described CD drive 208 and the FD drive 209, the DVD drive 210 reads data stored in the external recording medium, such as the DVD and/or writes data items onto the DVD.

Where an editing program and/or a printer driver is stored in the external recording medium inserted in the CD drive 208, the FD drive 209, the DVD drive 210, and so forth, the editing program and/or the printer driver may be installed into the HD 206 so that the editing program and/or the printer driver can be transferred to the RAM 205, as required.

The I/F 211 is configured to receive information transmitted from the user via the mouse 212 and the keyboard 213.

The modem 218 is provided, as a communication modem for performing communications between the host computer 200 and a communication device via an I/F 219, where the communication device is connected to an external communication network through a public line or the like.

The network-connection unit 207 controls the connection between the host computer 200 and a network such as a local-area network (LAN) via an I/F 214.

A signing process performed for generating signature data by adding padding data to transmitted message information and a verifying process performed for verifying the transmitted message information based on the signature data according to a first embodiment will be described next.

Figure 3:
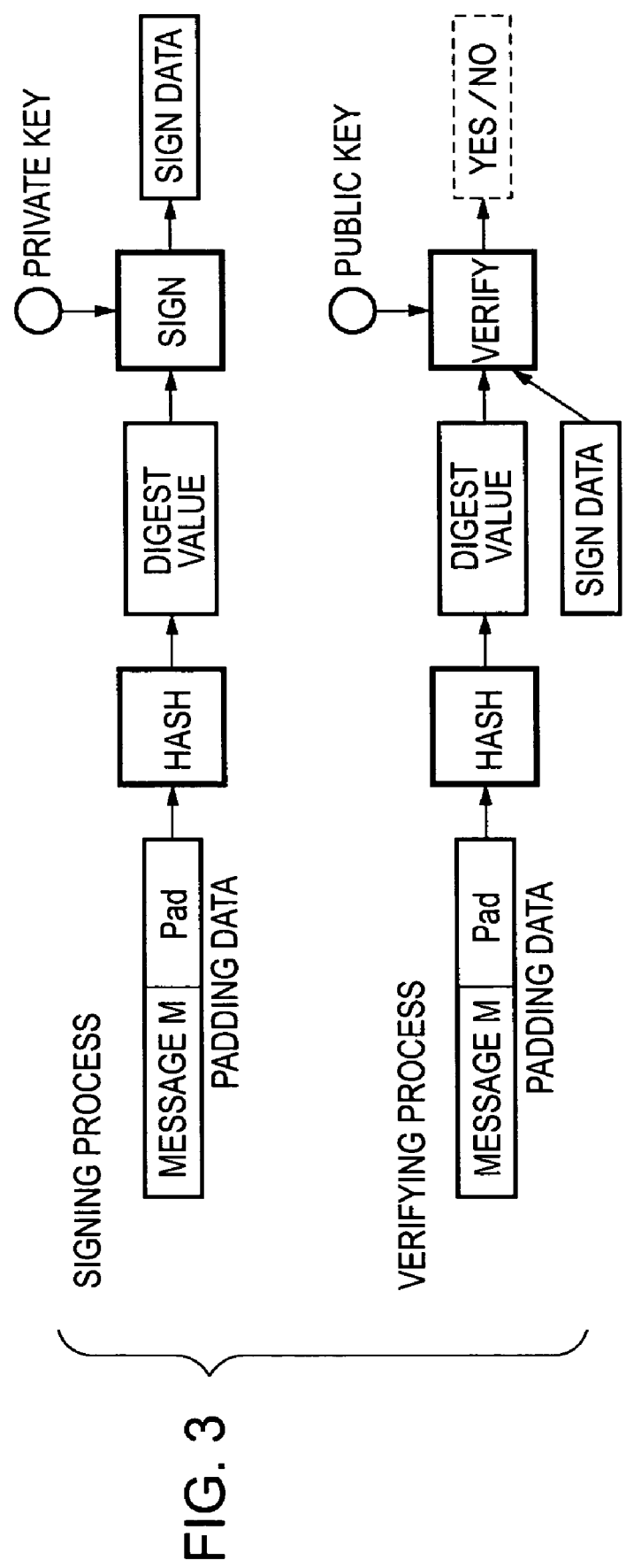
FIG. 3 shows a signing process and a verifying process according to the first embodiment.

FIG. 3 is a diagram illustrating the signing process and the verifying process according to the first embodiment. According to the first embodiment, padding data (random numbers) Pad is added to a transmitted message M. The details of the verify process will be described with reference to FIG. 4.

Figure 4:
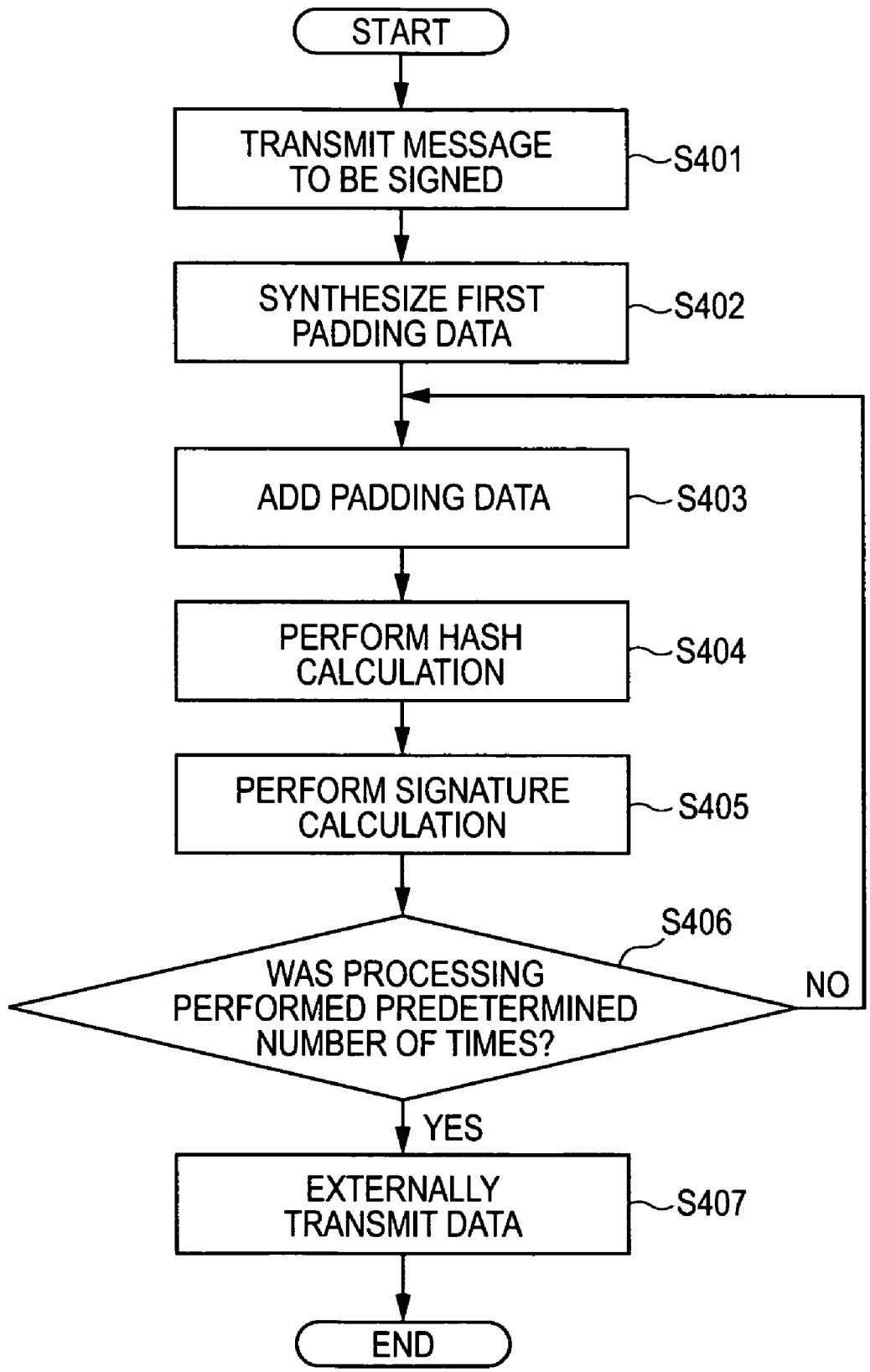
FIG. 4 is a flowchart illustrating the signing process according to the first embodiment.

FIG. 4 is a flowchart illustrating the signing process of the first embodiment. The signing process is achieved by executing a predetermined program stored in the HD 206 or the like by the host computer 200, or the CPU 203, for example, according to a transmission instruction transmitted from the user via the mouse 212 and/or the keyboard 213.

First, the message M to be signed is transmitted, at step S401, and random number Pad_0 is generated by using a suitable pseudorandom-number generator (not shown) and stored in the HD 206 or the like, as the padding data, at step S402. The padding data generated at step S402 will be used, at step S403 that will be described later.

Next, at step S403, the padding data generated at step S402, or step S405 that will be described later is added to the message M transmitted at step S401. Namely, at first, the padding data Pad_0 generated at step S402 is added to the message M. However, where it is determined that processing corresponding to steps S403 to S405 is not performed a predetermined number of times, at step S406 that will be described later, digital-signature data generated at step S405 is added to the message M, as padding data Pad_(i−1).

Parameter i of the padding data Pad_(i−1) is incremented by the same value as that of a counter (initial value i=1) configured to count a predetermined number of times that will be described later, at step S406. Information about the predetermined number of times is stored in the HD 206 or the like, or transmitted with the message M, at step S401.

Next, at step S404, hash processing is performed for the message M to which the padding data Pad_(i−1) is added at step S403 and fixed-length data (D_i) is calculated. Then, at step S405, the digital-signature data is generated by converting the fixed-length data (D_i) by using a private key S_i, so that the signing process is achieved.

The processing corresponding to the above-described steps S403 to S405 is shown by the following mathematical expressions, where characters within parentheses indicate the steps:

$$M\_i := M \| Pad\_(i-1) \qquad (S403)$$

$$D\_i := H(M\_i) \qquad (S404)$$

$$Pad\_i := Sign(S\_i; D\_i) \qquad (S405)$$

Here, H( ) indicates a hash function and Sign (A; B) indicates the signature data for B by using private key A. The private key S_i is stored in the HD 206 or the like, or transmitted with the message M, at step S401.

Next, at step S406, it is determined whether or not the processing corresponding to the above-described steps S403 to S405 has been performed the predetermined number of times. If the value of the counter is not equivalent to the predetermined number of times, the parameter i is incremented and the above-described processing is performed again. If the value of the counter is equivalent to the predetermined number of times, the flow proceeds to step S407.

Figure 5:
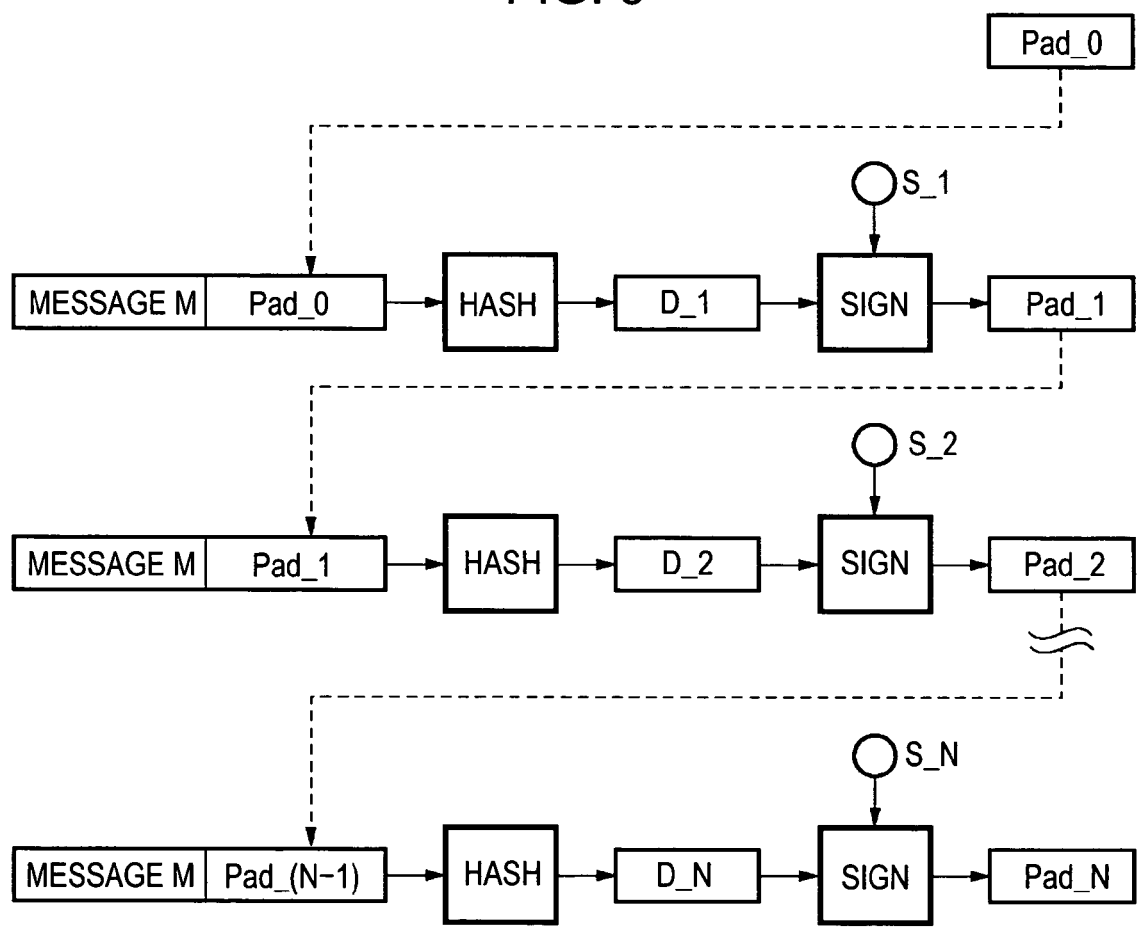
FIG. 5 shows the signing process according to the first embodiment, where a predetermined number of times is determined to be N.

If the predetermined number of times is N, Pad_0, Pad_1, . . . , and Pad_N are externally transmitted, at step S407. The Pad_N functioning, as signature data, Pad_(N−1) functioning, as the padding data, the message M, the public key P_N corresponding to the private key S_N are transmitted to a verifier. FIG. 5 is a diagram of the signing process according to the first embodiment, where the predetermined number of times is determined to be N.

Next, the details of the verifying process according to the first embodiment will be described with reference to FIG. 6. The verifying process is performed for verifying a transmitted message based on the signature data generated by the above-described signing process.

Figure 6:
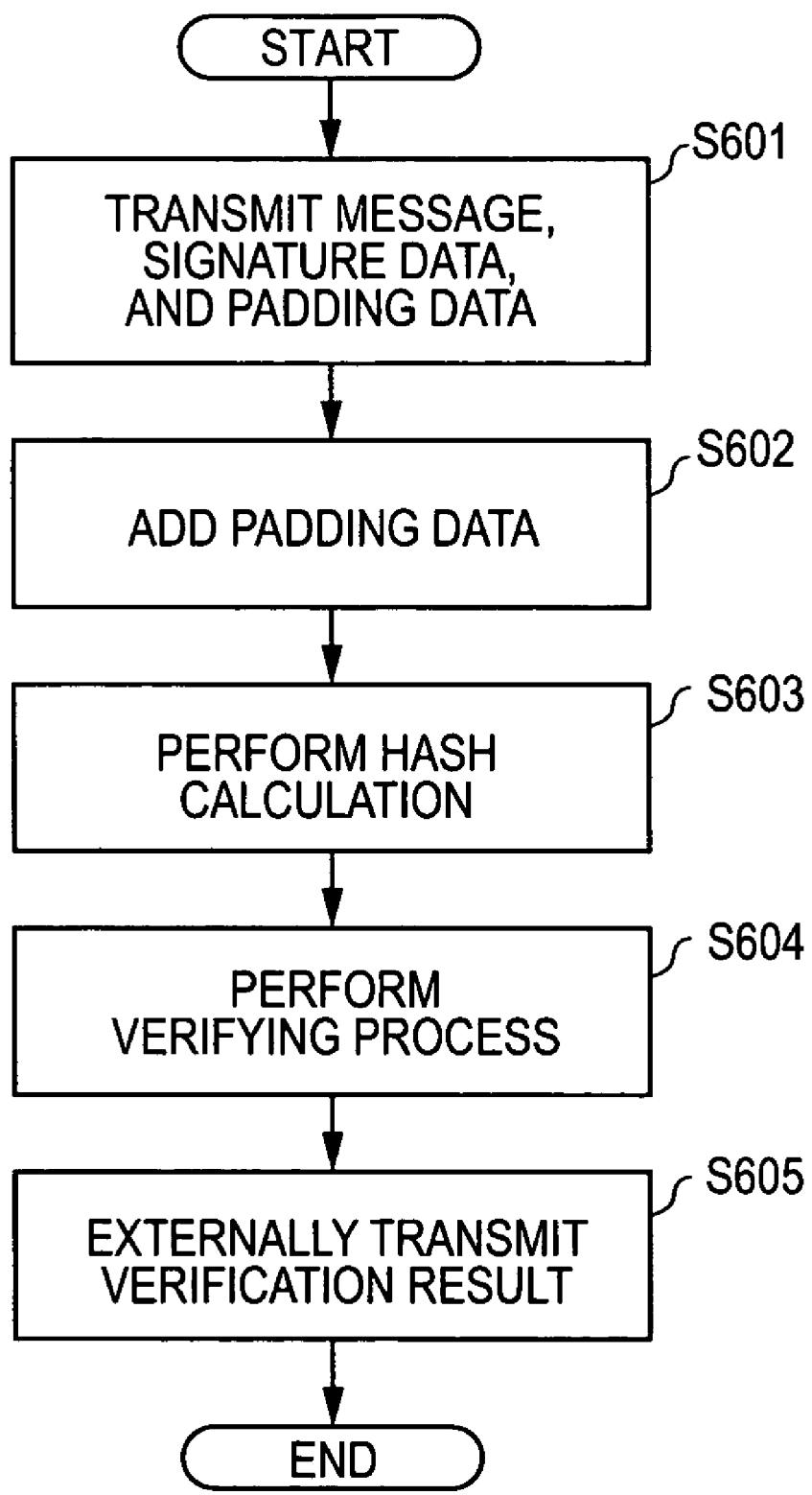
FIG. 6 is a flowchart illustrating the verifying process according to the first embodiment.

FIG. 6 is a flowchart illustrating the verifying process according to the first embodiment. The verifying process is achieved by executing a predetermined program stored in the HD 206 or the like by the host computer 200, or the CPU 203, for example, according to a transmission instruction transmitted from the user via the mouse 212 and/or the keyboard 213.

First, at step S601, the message M to be verified, the padding data Pad_(N−1), and the signature data Pad_N are transmitted. The public key P_N used at step S604 that will be described later may also be transmitted.

Next, at step S602, the padding data Pad_(N−1) is added to the message M to be verified that was transmitted at step S601. Then, at step S603, hash processing is performed for the message M to which the padding data Pad_(N−1) is added such that fixed-length data (D_N) is calculated.

Next, at step S604, it is verified whether or not data obtained by converting (decoding) the signature data Pad_N that was transmitted at step S601 by using the public key P_N agrees with the fixed-length data (D_N) obtained by subjecting the transmitted message M to the hash processing at step S603.

The processing corresponding to the above-described steps S602 to S604 is shown by the following mathematical expressions, where characters within parentheses shown on the left indicate the steps:

$$M\_N := M \| \text{Pad}\_(N-1) \quad (S602)$$

$$D\_N := H(M\_N) \quad (S603)$$

$$\text{Verify}(P\_N; D\_N; \text{Pad}\_N) \quad (S604)$$

Here, H( ) indicates a hash function and Verify (A; B; C) indicates verification of signature data C performed for B by using the public key A. In the process shown as Verify (A; B; C), the public key A corresponds to PUBLIC KEY shown in FIG. 1, message B corresponds to DIGEST VALUE shown in FIG. 1, the signature data C corresponds to SIGN DATA shown in FIG. 1. The public key P_N is stored in the HD 206 in advance, or transmitted at step S601.

Figure 7:
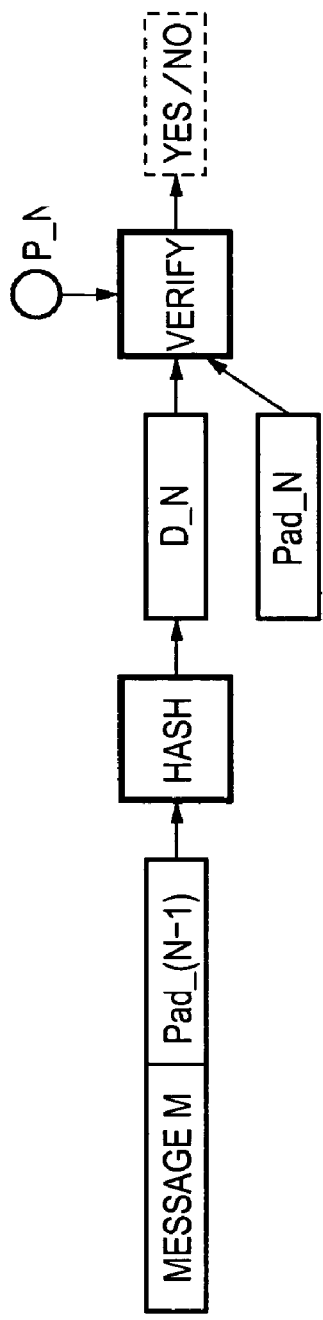
FIG. 7 shows the verifying process according to the first embodiment.

Then, the result of the verifying process performed at step S604 is externally transmitted, at step S605. FIG. 7 shows the verifying process according to the first embodiment.

Modification of First Embodiment

An example modification of the verifying process according to the first embodiment is described next. According to the modification, where the private key S_N leaks out, another public key is released, so as to be in public view so that the verifying process can be performed.

At step S407 shown in FIG. 4, only the public key P_N is transmitted (released) to the verifier. Where the private key S_N corresponding to the public key P_N leaks out or becomes fragile, the two following information items are released:

| a) | public key | P_(N − 1) |
| b) | padding data | Pad_(N − 2) |

Subsequently, the verifying process using the public key P_(N−1) can be achieved, by performing the following calculations:

$$(S602+) M\_(N-1) := M \| \text{Pad}\_(N-2)$$

$$(S603+) D\_(N-1) := H(M\_(N-1))$$

$$(S604+) \text{Verify}(P\_(N-1); D\_(N-1); \text{Pad}\_(N-1))$$

Figure 8:
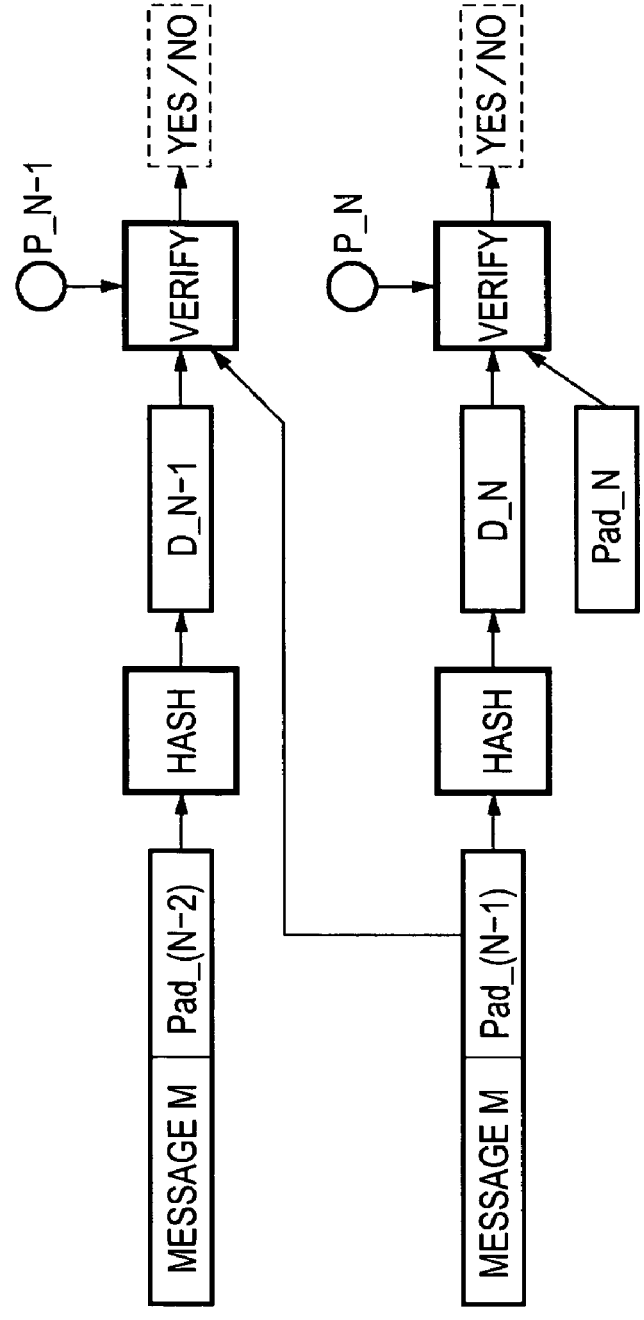
FIG. 8 shows an example modification of the verifying process according to the first embodiment.

Namely, until the private key S_N leaks out or becomes fragile, data on the public key P_(N−1) and the padding data Pad_(N−2) is not known. Therefore, the data can be used as a signature generated by using a new key. Further, if a private key S_(N−1) leaks out or becomes fragile, a public key P_(N−2) and padding data Pad_(N−3) are released, so as to be in public view. By releasing a public key and padding data one after another, as required, it becomes possible to prolong the effective period of a signature. FIG. 8 shows the example modification of the verifying process according to the first embodiment.

Figure 9:
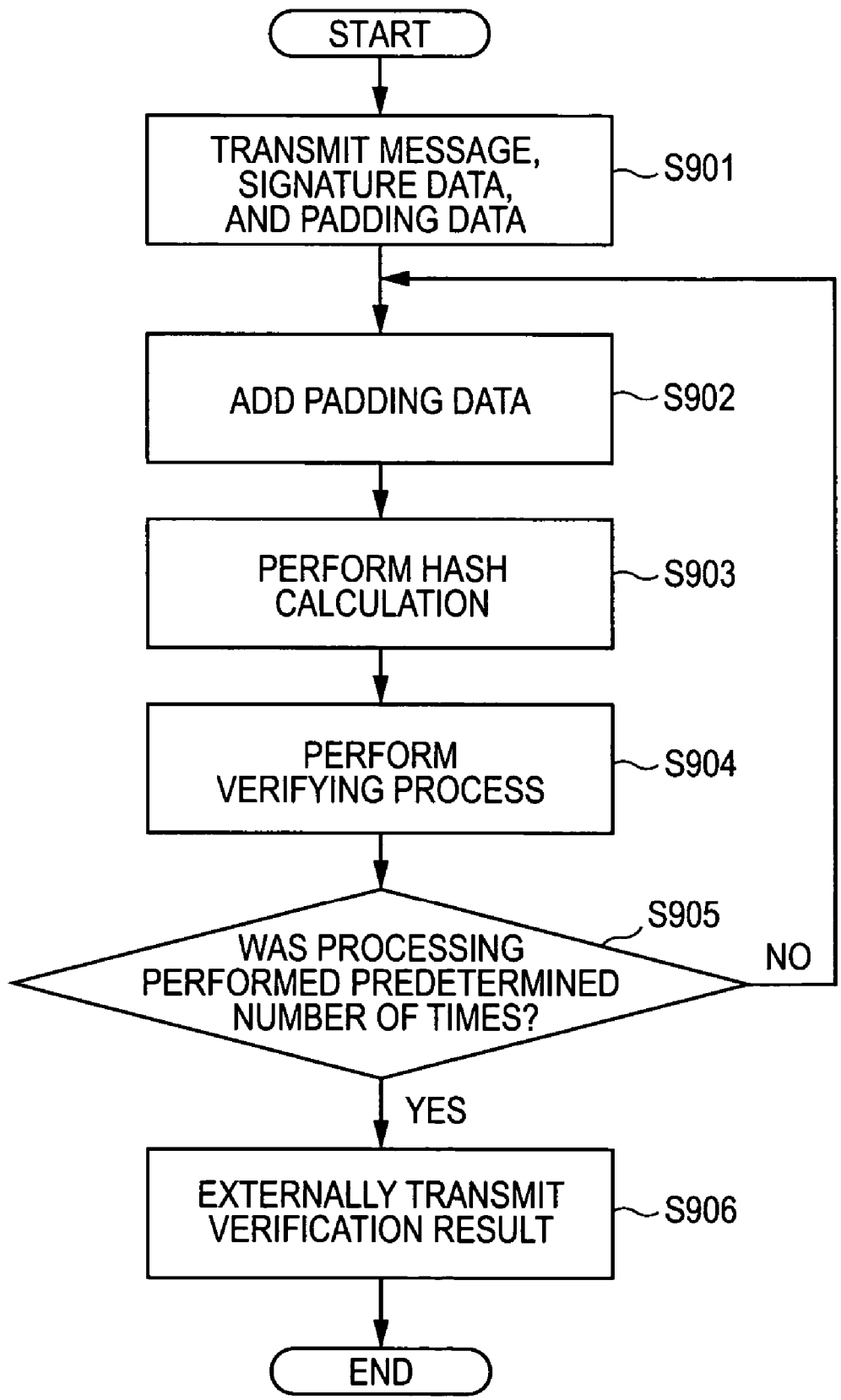
FIG. 9 is a flowchart illustrating the example modification of the verifying process according to the first embodiment.

FIG. 9 is a flowchart illustrating the example modification of the verifying process according to the first embodiment.

First, at step S901, the message M to be verified, padding data Pad_(N−i−1), and the signature data Pad_N are transmitted. A public key P_(N−i) used at step S904 that will be described later may also be transmitted. Here, the value of the parameter i is from 0 to L, where the specifier L denotes the value obtained by subtracting one from the predetermined number of times that will be described later. Further, information about the predetermined number of times is stored in the HD 206 or the like, or transmitted with the message M, at step S901.

Next, at step S902, the padding data Pad_(N−i−1) is added to the message M that was transmitted at step S901. Then, at step S903, hash processing is performed for the message M to which the padding data Pad_(N−i−1) is added such that fixed-length data (D_(N−i)) is calculated. Then, at step S904, it is determined whether or not data obtained by converting (decoding) the signature data Pad_(N−i) by using the public key P_(N−i) agrees with the fixed-length data (D_(N−i)) obtained by subjecting the transmitted message M to the hash processing at step S903. Subsequently, the transmitted message M is verified.

The processing corresponding to the above-described steps S902 to S904 is shown by the following mathematical expressions, where characters within parentheses shown on the left indicate the steps:

$$M\_(N-i) := M \| \text{Pad}\_(N-i-1) \quad (S902)$$

$$D\_(N-i) := H(M\_(N-i)) \quad (S903)$$

$$\text{Verify}(P\_(N-i); = D\_(N-i); \text{Pad}\_(N-i)) \quad (S904)$$

Here, H( ) indicates a hash function and Verify (A; B; C) indicates verification of the signature data C performed for B by using the public key A. Further, the public key P_(N−i) is stored in the HD 206 in advance, or transmitted at step S901.

Next, at step S905, it is determined whether or not the processing corresponding to the above-described steps S902 to S904 has been performed the predetermined number of times. If not, the above-described processing is performed again. Otherwise, the flow proceeds to step S906, where the result of the verify process is externally transmitted.

Figure 1:
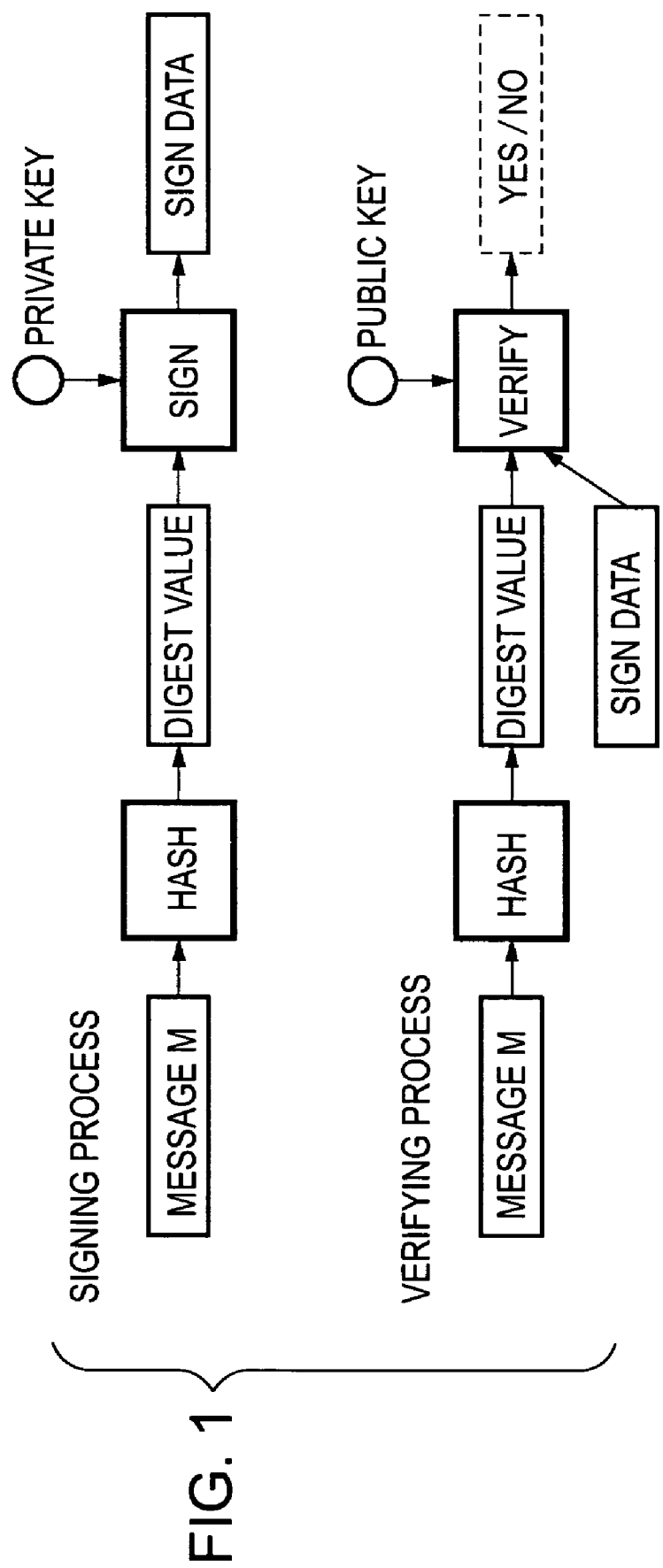
FIG. 1 shows a known signing process and a known verifying process.

If a module including the signing process and the verifying process that are shown in FIG. 1 exists, the module can be reused by adding padding data to transmitted data.

Thus, the fist embodiment allows generating a signature whose authenticity can be secured over a long term by using a known signature algorithm and/or a known hash algorithm, even though the computational security of the signature algorithm and/or the hash algorithm decreases due to increased calculation ability.

Second Embodiment

Next, an information-processing system according to a second embodiment of the present invention will be described with reference to the attached drawings. Since the configuration of the information-processing system of the second embodiment is the same as that of the information-processing system shown in FIG. 2 of the first embodiment, the description thereof is not repeated here.

In the first embodiment, the padding data is added to the transmitted message M, as shown in FIG. 3. However, in the second embodiment, the padding data is added to the fixed-length data obtained by performing hash processing for the transmitted message M, as shown in FIG. 10.

Figure 10:
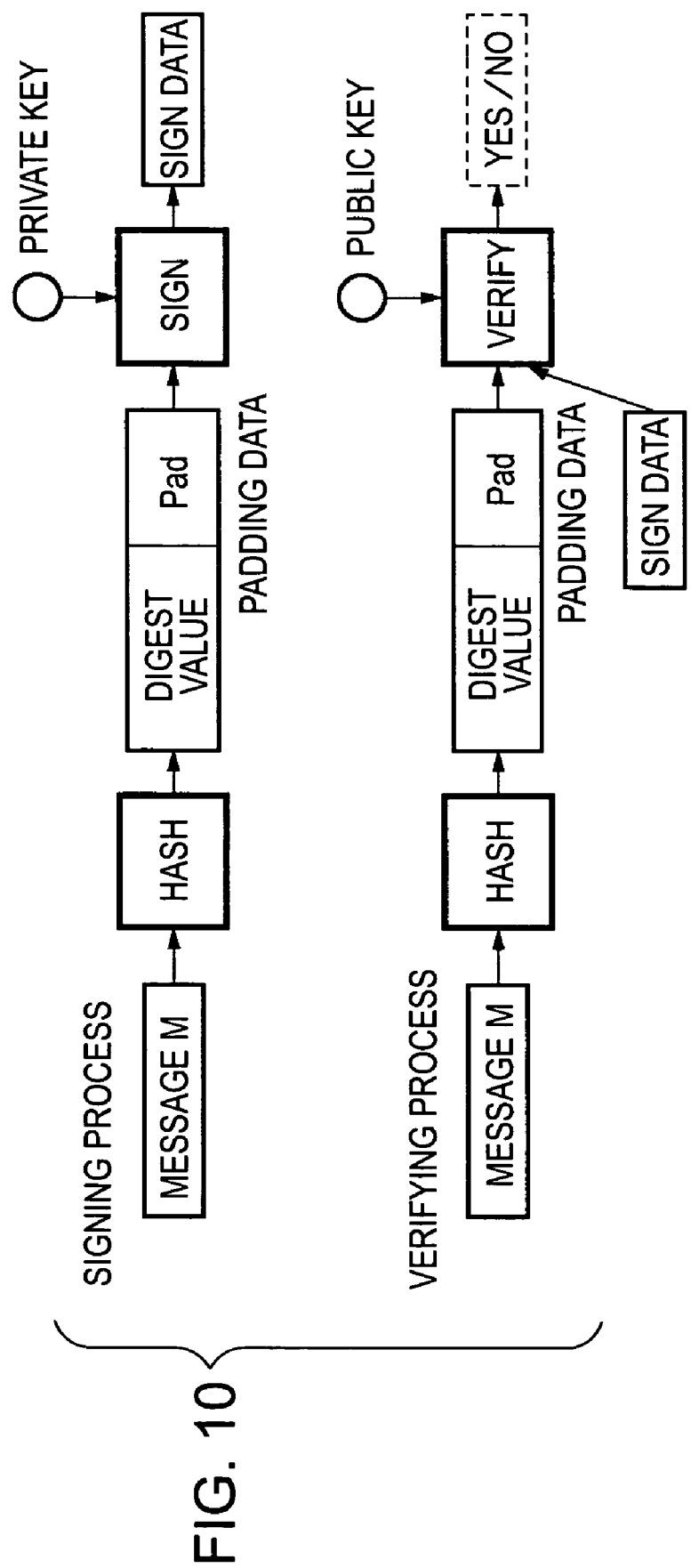
FIG. 10 is a diagram of a signing process and a verifying process according to a second embodiment of the present invention.

FIG. 10 is a diagram illustrating the signing process and the verifying process according to the second embodiment.

According to the second embodiment, the signing process can be achieved by exchanging step S403 and step S404 with each other, where step S403 and step S404 are shown in FIG. 4 and described above with reference to the first embodiment.

Namely, the message M is subjected to the hash processing so that the fixed-length data (D_i) is calculated, at step S404, the padding data generated at step S402 or step S405 is added to the fixed-length data (D_i), at step S403, and the signing process is performed, at step S405.

Further, the verifying process of the second embodiment can be achieved by exchanging step S602 and step S603 with each other, where step S602 and step S603 are shown in FIG. 6 and described above with reference to the first embodiment.

Namely, the message M is subjected to the hash processing so that the fixed-length data (D_N) is calculated, at step S603, the padding data Pad_(N−1) is added to the fixed-length data (D_N), at step S602, and the verifying process is performed, at step S604.

Thus, the second embodiment allows generating a signature whose authenticity can be secured over a long time period by using a known signature algorithm and/or a known hash algorithm, even though the computational security of the signature algorithm and/or the hash algorithm decreases due to increased calculation ability.

Third Embodiment

Next, an information-processing system according to a third embodiment of the present invention will be described. Since the configuration of the information-processing system of the third embodiment is the same as that of the information-processing system shown in FIG. 2 of the first embodiment, the description thereof is not repeated here.

The first and second embodiments illustrate the methods for assuring the validity of a signature even though a signed private key leaks out, or becomes fragile. However, the third embodiment illustrates a method for assuring the validity of the signature even though the signing algorithm and the hash algorithm become unsafe.

In the first and second embodiments, the hash function H( ) used for the hash calculations corresponding to steps S404, S603, and S903 use the same function as that of the verifying algorithm Verify( ) that is used for the signature calculation corresponding to step S405 and that is used for the verifying process corresponding to steps S603 and S904. However, when the processing is repeated, different functions generated based on different algorithms may be used.

For example, a pair of keys P_1 and S_1 for RSA and a pair of keys P_2 and S_2 for DSA are prepared. If a signature is generated by using the key S_1, hash algorithm MD5 is used. If a signature is generated by using the key S_2, hash algorithm SHA-1 is used. Further, data on an algorithm to be used may be transmitted, at each of steps S401, S601, and S901, as required.

Further, the pairs of keys (P_i, S_i; 1≦i≦N) may be generated in the descending key-length order. Subsequently, the key length is selected so that the keys can be used over a long term. For example, the length of a pair of keys S_3 and P_3 is 1024 bit RSA, the length of the pair of keys S_2 and P_2 is 2048 bit RSA, and the length of the pair of keys S_1 and P_1 is 4096 bit RSA.

Thus, the third embodiment illustrates a method for generating a signature whose authenticity can be assured over a long term, even though the signing algorithm and the hash algorithm become unsafe.

Fourth Embodiment

Next, an information-processing system according to a fourth embodiment of the present invention will be described. Since the configuration of the information-processing system of the fourth embodiment is the same as that of the information-processing system shown in FIG. 2 of the first embodiment, the description thereof is not repeated here.

The above-described embodiments illustrate methods configured to assure the authenticity of a signature generated for a predetermined message for a long term. However, the information-processing system of the fourth embodiment is used, where a signed message is a public-key certificate.

When communications are performed between a client and a server, a user certification test needs to be performed for the client that tries to access the resource of the server. In that case, a public-key certificate such as ITU-U Recommendation X.509 or the like is often used, so as to certify the user. The public-key certificate denotes data assuring the connection between the public key and the user thereof. Further, the public-key certificate is signed by a reliable third-party authority referred to as a certification authority. For example, according to a user-certification method using a secure socket layer (SSL) having many browsers mounted thereon, it is determined whether or not a user has the private key corresponding to a public key included in a public-key certificate presented by the user, thus achieving user certification.

Since the public-key certificate is signed by the certification authority, the user's and/or server's public key included in the public-key certificate is determined to be reliable. Therefore, if the private key used by the certificate authority, so as to perform the signing process, leaks out, or becomes fragile, all public-key certificates issued by the certificate authority become invalid. Since some certificate authorities manage a large number of public-key certificates, the above-described problem of the private key greatly affects the electronic commerce industry, for example.

For solving the above-described problem, a signature method that can assure the authenticity of a signature over a long time period is used.

For example, a signature method using a public-key certificate according to ITU-U Recommendation X.509 v.3 will be described. According to the above-described method, an optional field referred to as extensions is provided so that a new proprietary extension to an application and/or a protocol can be stored therein. Therefore, padding data used in the fourth embodiment is stored in the extensions, as is the case with FIG. 3 where the padding data is included in the message to be signed.

Figure 11:
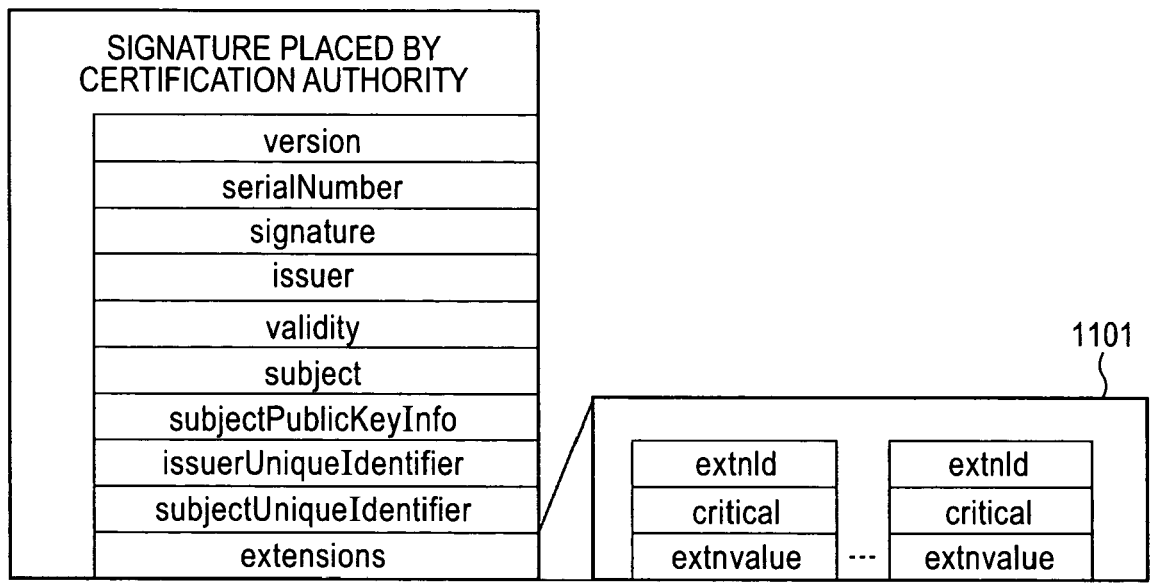
FIG. 11 shows a format that is set based on ITU-U Recommendation X.509 v.3.

FIG. 11 shows a format that is set based on ITU-U Recommendation X.509 v.3. As shown in FIG. 11, an optional field 1101 referred to as extensions is included in data to be signed by the certificate authority.

Here, a method adapted to perform the verifying process by using a public-key certificate will be described, with reference to FIG. 12.

Figure 12:
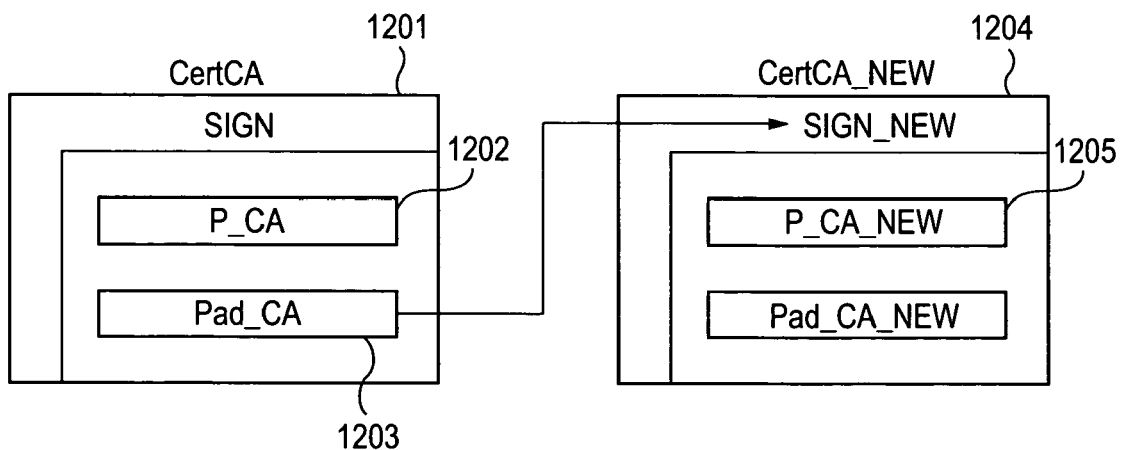
FIG. 12 illustrates a method adapted to perform the verifying process by using a public-key certificate.

As shown in FIG. 12, a public key P_CA 1202 is provided in a public-key certificate CertCA 1201 issued by a certificate authority and padding data Pad_CA 1203 is provided in the above-described padding data extensions. Subsequently, even though the private key S_CA corresponding to the public key P_CA 1202 leaks out, a new public-key certificate CertCA_NEW 1204 including a public key P_CA_NEW 1205 is issued, where the public key P_CA_NEW 1205 also corresponds to the padding data Pad_CA. Subsequently, it becomes possible to prevent a user public-key certificate issued by the public-key certificate CertCA 1201 from being invalidated.

The user public-key certificate can be verified by performing ordinary certificate-path verification and performing signature verification using the public key P_CA_NEW 1205, where the padding-data extensions are included in the user public-key certificate.

Thus, the first to fourth embodiments illustrate methods adapted to generate signature data whose authenticity can be assured over a long time period by using the known signing algorithm and hash algorithm, even though the computational security of the signing algorithm and hash algorithm decreases due to increased calculation abilities.

Other Embodiments

The present invention can be used, as part of a system including a plurality of components including, for example, a host computer, an interface, a reader, and a printer, and/or part of a single apparatus such as a copier and a facsimile machine.

The present invention is achieved not only by using the systems and methods configured to achieve the above-described embodiments. Further, the present invention is achieved not only by using the methods described in the above-described embodiments in combination. The present invention can also be achieved by supplying program code of software for implementing the functions of the above-described embodiments to a computer (CPU and/or micro-processing unit (MPU)) of the above-described systems and/or apparatuses so that the computer of the systems and/or apparatuses makes the above-described devices operate according to the supplied program code such that the above-described embodiments are achieved.

In that case, the program code itself achieves the functions of the above-described embodiments.

The storage medium for storing the program code may be, for example, a floppy disk, a hard disk, an optical disk, a magneto-optical disk, a CD-ROM, a magnetic tape, a non-volatile memory card, a ROM, etc.

Furthermore, the above-described embodiments can also be achieved when the above-described program code of the above-described embodiments is executed (performed) by using an operating system (OS), and/or other application software or the like running on the computer.

In another embodiment of the present invention, the supplied program code is stored in a memory of a function-extension board inserted in the computer or a function extension unit connected to the computer. Then, the above-described embodiments are realized by executing part of or the entire process by a CPU, etc. of the function extension board or the function extension unit based on instructions of the program code.

In other words, the foregoing description of the above-described embodiments has been given for illustrative purposes only and not to be construed as imposing any limitation in every respect.

The scope of the present invention is, therefore, to be determined solely by the following claims and not limited by the text of the specifications. Subsequently, modifications, equivalent structures and functions that are made within a scope equivalent to the scope of the claims fall within the true spirit and scope of the present invention.

This application claims the benefit of Japanese Application No. 2004-293075 filed Oct. 5, 2004, which is hereby incorporated by reference herein in its entirety.

What is claimed is:

1. A signature-generation method comprising:

an input step of inputting a message to be signed;

a hash process step, performed by a processor, of performing a hash process on the message to obtain fixed-length data;

an addition step of adding nth padding data to the fixed-length data obtained by performing the hash process on the message, wherein n is an integer from 1 to N, and N is equal to or greater than 2;

a generation step of generating nth signature data from data obtained by performing the hash process on the message by using nth private key, wherein key length of the nth private key is longer than key length of (n+1)th private key and;

an output step of outputting first padding data through nth padding data, nth signature data, and the message, wherein the hash process step, the addition step, and the generation step are repeated a predetermined N number of times, and (n−1)th signature data generated in the generation step is the nth padding data added to the fixed-length data in the addition step, and wherein the message, the padding data, and the signature data are coupled to one another so that at least one public-key certificate is generated, and where the addition step and the generation step are performed the predetermined N number of times, algorithms used for the hash function vary every time the addition step and the generation step are performed, algorithms used for a public-key cryptosystem vary every time the addition step and the generation step are performed, and key length used for the public-key cryptosystem decreases every time the addition step and the generation step are performed.

2. A signature-generation method according to claim 1, wherein the public-key certificate includes at least one extension part in a format that is set based on ITU-U recommendation X.509 v.3 and wherein the padding data is stored in the extension part.

3. A computer-readable recording medium configured to store a signature generation method comprising:

an input step of inputting a message to be signed;

a hash process step of performing a hash process on the message to which the nth padding data has been added obtain fixed-length data;

an addition step of adding nth padding data to the fixed-length data obtained by the hash process on the message, wherein n is an integer from 1 to N, and N is equal to or greater than 2;

a generation step, performed by a processor, of generating nth signature data from data obtained by performing the hash process on the message by using nth private key, wherein key length of the nth private key is longer than key length of (n+1)th private key; and;

an output step of outputting first padding data through nth padding data, nth signature data, and the message, wherein the hash process step, the addition step, and the generation step are repeated a predetermined N number of times, and (n−1)th signature data generated in the generation step is the nth padding data added to the fixed-length data in the addition step, and wherein the message, the padding data, and the signature data are coupled to one another so that at least one public-key certificate is generated, and where the addition step and the generation step are performed the predetermined N number of times, algorithms used for the hash function vary every time the addition step and the generation step are performed, algorithms used for a public-key cryptosystem vary every time the addition step and the generation step are performed, and key length used for the public-key cryptosystem decreases every time the addition step and the generation step are performed.

4. An information-processing apparatus comprising:

an input unit configured to input a message to be signed;

a hash process unit configured to perform a hash process on the message to obtain fixed-length data;

an addition unit configured to add nth padding data to the fixed-length data obtained by the hash process, wherein n is an integer from 1 to N, and N is equal to or greater than 2;

a generation unit configured to generate nth signature data from data obtained by performing the hash process on the message using nth private key, wherein key length of the nth private key is longer than key length of (n+1)th private key; and an output unit configured to output the first padding data through the nth padding data, the nth signature data, and the message, wherein processing performed by the hash process unit, the addition unit, and the generation unit are repeated a predetermined N number of times, and (n−1)th signature data generated by the generation unit is the nth padding data added to the input message by the addition unit, and wherein the message, the padding data, and the signature data are coupled to one another so that at least one public-key certificate is generated, and where processing in the addition unit and the generation unit are performed the predetermined N number of times, algorithms used for the hash process vary every time processing in the addition unit and the generation unit are performed, algorithms used for a public-key cryptosystem vary every time processing in the addition unit and the generation unit are performed, and key length used for the public-key cryptosystem decreases every time processing in the addition unit and the generation unit are performed.

* * * * *